Figure 1:
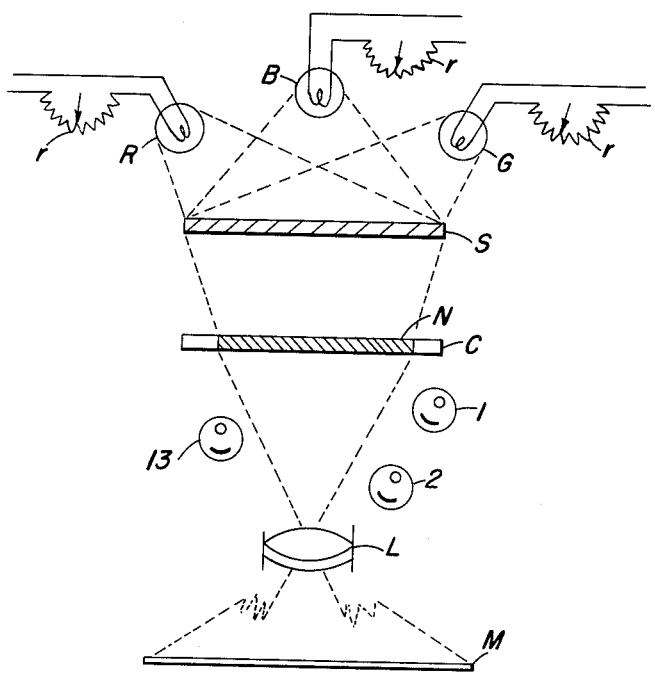

Aug. 10, 1965  R. W. G. HUNT ETAL  3,199,402
PRINTING APPARATUS FOR COLOR PHOTOGRAPHY
Filed Nov. 1, 1960

ROBERT W. G. HUNT
PETER B. WATT
INVENTORS

BY R. Frank Smith

ATTORNEYS 3,199,402
PRINTING APPARATUS FOR COLOR
PHOTOGRAPHY
Robert W. G. Hunt, Wealdstone, and Peter Bernard Watt, Stonyhall, Stevenage, England, assignors to Eastman Kodak Company, Rochester, N.Y., a corporation of New Jersey
Filed Nov. 1, 1960, Ser. No. 66,530
Claims priority, application Great Britain, Nov. 12, 1959, 38,346/59
6 Claims. (Cl. 88—24)

The present invention relates to color photography and, more particularly, to making multi-color prints from multi-color negatives or positives on light sensitive multi-color photographic material.

In order to obtain color photographic prints of a desired color balance, it is often necessary to adjust the color composition of the printing light used to illuminate the negative or transparency when making the print. This adjustment of color can be made in a variety of ways; for example, colored filters of different strengths and hues can be inserted into the printing beam, or colored filters of a single strength can be inserted into the printing beam by varying amounts (the filtered and unfiltered components being subsequently mixed), or beams of red, green, and blue light can be varied in intensity individually and then additively mixed. In all these instances, and in other ways of adjusting the color of the printing beam, it is convenient to have a measure of the amount by which the color has been changed as a result of a given adjustment. This can take the form, for instance, of a calibration of filter strengths in the first example, of a calibration of filter strengths and positions in the second example, and of a calibration of the method controlling the intensities of the beams in the third example. Calibrations of this type are often difficult to carry out to the required accuracy, and may change with time because of the fading of filters or for other reasons. The present invention offers an improved method of measuring the amount by which the color of the printing light has been altered; the calibration required is easy to make and unlikely to change. One form of the invention includes means for measuring differences in the color of various negatives, and hence provision for making prints which integrate approximately to a grey as described and claimed in U.S. Patent 2,566,264.

The invention involves the use of photo-electric cells filtered so as to reproduce approximately the spectral sensitivity curves of the color print material being used. Some of the color-adjusted light is made to fall on these cells, either before passing through the negative, if it is not required to take the color of the negative into account when making the measurement, or after passing through the negative if the effect of the latter is to be included. When a three-layer color material is being used there will be three different types of filtration used over the photo-cells, representing each of the three layers of the material, normally sensitive mainly in the red, green and blue parts of the spectrum.

It is well known that the outputs of the cells can be fed one at a time into a galvanometer or micro-ammeter or similar electrical measuring device, or, if three such measuring devices are available, simultaneously into all three, to give three readings of the responses from the three differently filtered cells. If necessary more than one photocell can be used for each part of the spectrum in order to increase the electrical signal being measured or to obtain a more nearly average reading if the area of light to be evaluated is large. The three readings obtained can then be used to provide a measure of the adjustments in color that are made and, when the color of the negative is included the principle of making prints which integrate to a grey can be achieved by arranging the adjustments so that, for each color, constant readings are always obtained no matter what the color of the negative inserted.

In the present invention, however, the outputs from the differently filtered cells are subtracted from one another in pairs so that only differences and not absolute magnitudes are measured. This arrangement has the advantages that color balance can be evaluated independently of over-all intensity, which greatly improves the facility of operation of the system and also makes less stringent demands upon the linearities of the outputs of the photocells and the readings of the electrical measuring devices, because the adjustments required in color balance generally cover a smaller range than those required in over-all intensity.

The apparatus is so set up that, for a suitable negative and the batch of print material being used, when the color of the printing light is such as to give a print of desired color balance, the output from two pairs of differently filtered photocells, for example red and blue, and green and blue, when connected in opposition to one another in each case, is zero. In the case when the effect of the negative is to be included, when a negative of different color balance is inserted, the color of the light is adjusted so as once more to result in zero output from both pairs of differently filtered barrier-layer cells; this ensures that if the first negative resulted in a print which approximately integrated to grey, then the second negative would give a print which did likewise.

It is necessary in such an apparatus to have means whereby adjustment can be made for print materials of various color balances and also means whereby, if required, prints can be made which differ in color balance from the integration to grey condition, or any other condition being used, by known amounts. These facilities are achieved in the present invention by attenuating the photocell currents, or amplified currents derived therefrom, by means of potentiometers in two stages; one stage providing for variations in print material and the other for departure from the standard condition. It is desirable that the latter control be calibrated so that it can be used either for making prints which differ from integration to grey by known amounts, or for altering the color of the printing light by known amounts; in the former case, the color balance of the negative must be included in the assessment by placing the photocells after the negative stage in the optical system, in the latter case the effects of the color balance of the negative must be excluded by placing the photocells before the negative stage in the optical system, or, if this is not done, the color balance of the negative must be kept constant while the color of the printing light is being adjusted.

In order that the invention may readily be understood, one form thereof will now be described, by way of example, with reference to the accompanying drawing, in which FIGURE 1 is a diagrammatic view of one form of projection printer with which the present invention is combined and FIGURE 2 of which is a circuit diagram showing the manner in which the outputs of a pair of photo-electric cells may be utilized in accordance with one form of the invention for controlling the balance of the red and blue light used for photographic color printing.

Referring now to the form of the invention illustrated by way of example in FIGURE 1, there is employed a standard projection printer having a multiple light source including a red lamp R, a green lamp G, and a blue lamp B which illuminate a suitable diffusing screen S. This diffusing screen mixes the three colored lights and provides a light source for illuminating a negative N positioned in a negative carrier C an image of which is projected by lens L onto a sheet of color print material M positioned in the focal plane of the lens by means not shown. The spectral composition of the printing light may be varied by means of adjustable rheostats R connected in series with each of the lamps R, G and B. In the embodiment shown a red, a blue and a green sensitive photocell 1, 2 and 13, respectively are positioned to measure the amount of red, blue and green light passing through the negative N to control the exposures. However, as explained above, if it is not necessary to take the color of the negative into account then the photocells may be between the diffusing screen S and the negative. The present invention is not limited to use of a light source of the type disclosed by way of illustration, but, as mentioned previously, the adjustment of the color of the printing source could be made in a variety of ways, for example, by inserting color filters of different strength into the printing beam, by the insertion of color filters of a single strength into the printing beam by varying amounts, etc.

Figure 2:
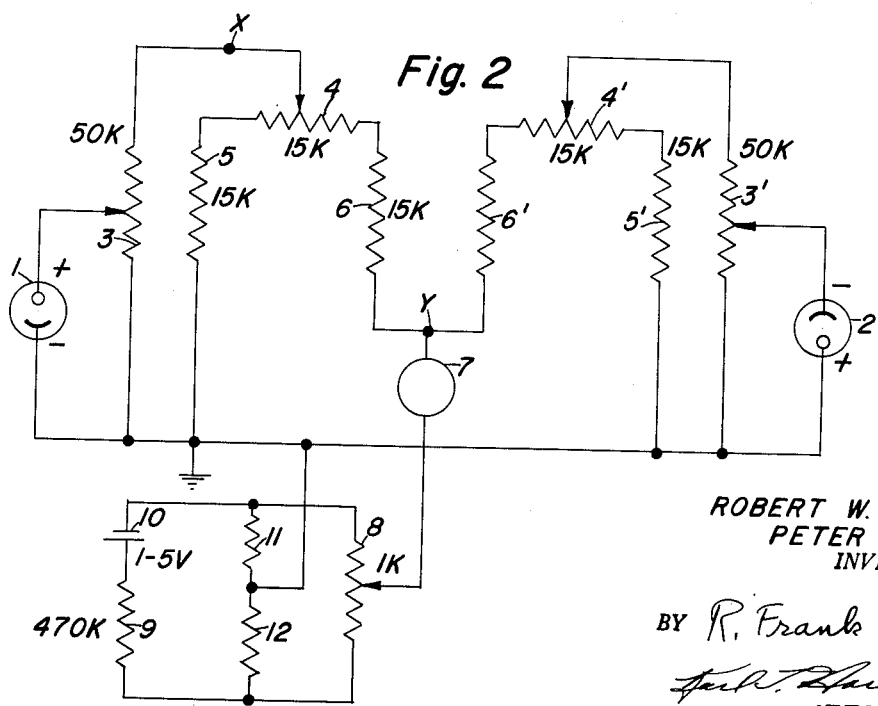

As illustrated in FIGURE 2, the red and blue sensitive photocells 1 and 2, which may be barrier type photocells, provided with red and blue filters (not shown), respectively, to render them respectively responsive to red and blue light, are connected in the circuit in opposed relationship.

The photocell 1 has its negative side connected to earth and its positive side connected to the adjustable contact of a potentiometer 3 which is connected between earth and the adjustable contact of a second potentiometer 4, the latter having one side connected to earth through a resistance 5 and the other side connected through a resistance 6 to one terminal of an electrical indicating device such as a galvanometer 7. The photocell 2 has its positive side connected to earth and its negative side connected to the same terminal of the galvanometer 7 as the positive side of the photocell 1 through a similar arrangement of resistances 5' and 6' and potentiometers 3' and 4'.

The other side of the galvanometer 7 is connected to the adjustable contact of a potentiometer 8 which is connected in series with a resistance 9 and a low tension power supply indicated by a battery 10. A pair of series connected resistances 11 and 12 are connected in parallel with the potentiometer 8 and have their common sides connected to earth.

In one practical embodiment of the invention, potentiometers 3 and 3' were each 50,000 ohms, potentiometers 4 and 4' were each 15,000 ohms, resistances 5, 5', 6 and 6' were each 15,000 ohms, potentiometer 8 was 1,000 ohms, resistances 9, 11 and 12 were each 470 ohms, the critical damping resistance of the galvanometer was 20,000 ohms and the power supply comprised a 1.5 volt battery.

The operation of the device can most readily be understood by first of all assuming that the adjustable contact of the potentiometer 8 has been set to its center point. Under these conditions, one side of the galvanometer 7 is effectively connected to earth through a low resistance and the galvanometer will indicate zero current when the currents flowing through resistances 6 and 6' are equal and opposite; under these conditions the point Y will also be at earth potential.

The potentiometer 4 is used to adjust the red-cyan balance of individual resultant prints as for instance when it is required to make a print which does not integrate to gray. The potentiometer 3 is used to compensate for variation in the red light speed of the paper and for making overall adjustments in color balance. The potentiometers 4' and 3' have similar functions for the blue channel.

Adjustment of the potentiometer 4 alters the proportions by which the current at the point X in the circuit divides between the resistances 5 and 6. With components having the values hereinbefore mentioned, a variation by a ratio of 2:1 in the proportion of the current at X that is fed to the point Y can be achieved by adjusting the potentiometer 4. The arrangement of the components 4, 5 and 6 has the advantage that the impedance between the point X and earth is almost independent of the setting of the potentiometer 4, thereby obviating any appreciable interaction between the potentiometers 3 and 4 and enabling the potentiometer 4 to be provided with a calibrated scale, the accuracy of which is substantially unaffected by the setting of the potentiometer 3. In order to obtain the maximum speed of operation it is necessary to choose component values such that the external impedance across the galvanometer terminals is approximately equal to the critical damping resistance of the galvanometer. In the example hereinbefore provided, this impedance is about 20,000 ohms and by using a fairly high value for the potentiometer 3, this impedance is not appreciably influenced by the settings of the various potentiometers.

The mode of operating the potentiometers 3, 4, 3' and 4' is to adjust them to the required settings first and then to alter the color of the printing beam until the two currents of opposite polarity fed to the galvanometer 7 are equal, as indicated by the zero reading of the galvanometer.

So far the circuit has been considered with the potentiometer 8 set to its center point. If it is found that most dense negatives produce prints having a certain color bias, and that most thin negatives produce prints having a bias of that complementary color, the potentiometer 8 can be used to counteract these effects. If the color of the printing light is adjusted with potentiometer 8 set to its center point and this control is moved away from this setting, the galvanometer 7 will no longer indicate zero current, and the balance can then be restored by shifting the color balance so that additional light falls on one cell; which of the two cells requires additional light will depend on which direction the potentiometer 8 is moved away from its center position, and the amount of additional light flux required will depend on how far the control is moved; the amount of additional light flux, however, does not depend on the magnitudes of the light fluxes incident on the two cells before the balance of the circuit was disturbed by adjusting potentiometer 8. Hence this adjustment to the color of the printing light required to bring the galvanometer back to zero will be large when a dense negative is in the beam, but small with a thin negative. This would result in a progressive change in the color balance of the prints as the density of the negative changes. This change can be used to counteract an unwanted equal and opposite change caused, for instance, by reciprocity failure of the print material being used, or by any other cause.

As an alternative to the use of the auxiliary circuit comprising potentiometer 8 and resistances 11 and 12, this circuit could be omitted and one side of the galvanometer connected directly to earth. In this case, the zero reading of the galvanometer could be off-set by means of the mechanical adjustment provided on the galvanometer or by adjusting the color balance of the printing beam so as to bring the galvanometer pointer to a suitable point away from the zero point on the galvanometer scale.

As an alternative to using a galvanometer as a null indicator, a more robust meter can be used with a suitable D.C. amplifier employing either valves or transistors. Such an amplifier requires to have stable zero but does not require to have very stable gain. These conditions are readily met by the type of amplifier in which the D.C. signal is converted to an A.C. signal by a chopper; this A.C. signal is then amplified, rectified and indicated on a suitable meter. If such an alternative to a galvanometer is used, it is advisable to employ suitable values of the components in the balancing circuit so that it matches the input impedance of the amplifier.

In an actual printer it is necessary to provide a second circuit which is identical to the circuit hereinbefore described, but in this case one of the two photocells is the green sensitive cell 13 not used in the circuit hereinbefore described. Thus, the second circuit would have one photocell responsive to green light and a second photocell responsive to either red or blue light. The operation of the two circuits may be simplified if the potentiometers used for the color common to both circuits for adjusting the color balance of the resultant prints, are ganged together so that single controls can be used for adjusting the color balance of the prints in this particular color direction.

What we claim is:

1. An apparatus for making color prints, comprising a light source, whose spectral composition may be varied, two photoelectric means responsive to two different regions of the spectrum each comprising one or more barrier layer photocells covered with optical filters, the electrical outputs of said photoelectric means being related to the light intensity in said two regions of the spectrum and being connected, so that said outputs oppose each other, to an electrical indicating device whose null output, when produced by variation of the spectral composition of the light source, corresponds to a predetermined color balance.

2. An apparatus for making color prints, comprising a light source, whose spectral composition may be varied, two pairs of photoelectric means, one photoelectric means of each pair being responsive to a different region of the spectrum than the other photoelectric means of the same pair and one photoelectric means of each pair being responsive to the same region of the spectrum, the electrical outputs of the said photoelectric means being related to the light intensity in said three regions of the spectrum and being connected with the outputs of each pair of photoelectric means opposing each other and respectively to two electrical indicating devices whose null outputs, when produced by variation of the spectral composition of the light source, corresponds to a predetermined color balance.

3. An apparatus for making color prints according to claim 2 wherein the electrical outputs of the said photoelectric means is substantially proportional to the light intensity in said three regions of the spectrum.

4. An apparatus for making color prints according to claim 2 wherein the electrical outputs of the photoelectric means are attenuated by one or more adjustable resistive networks, and in which the resistive networks connected to the photoelectric means responsive to the same region of the spectrum are so coupled that adjustment of the attenuation of the output of said photoelectric means responsive to the same region of the spectrum produces the same attenuation of each electrical output from said photoelectric means.

5. An apparatus for making color prints according to claim 1, in which a source of electrical potential is connected in series with each electrical indicating device so that the null reading of said indicating devices and hence the color balance obtained will vary in accordance with said light intensity, 6. A method of making color prints having a predetermined color balance from a multicolor photographic negative wherein photoelectric means is provided for measuring the light intensity in different spectral regions comprising the steps of, resistively attenuating the outputs of the photoelectric means in accordance with the predetermined color balance established independently of the color balance in the negative, passing mixed light from a multiple light source through the multicolor negative onto the adjusted photoelectric means, the light source including independently controlled elements each emitting light of a different spectral region, measuring with the photoelectric means the light in the spectral regions passed through the negative, comparing the measured color balance with the predetermined color balance, adjusting the intensity of the elements of the light source to match the measured color balance with the predetermined color balance, and passing the adjusted light through the negative onto a photographic print paper.

References Cited by the Examiner

UNITED STATES PATENTS 2,544,196  3/51  Varden _____ 88—14
2,742,837  4/56  Streiffert _____ 95—75

FOREIGN PATENTS 288,471  5/53  Switzerland.

OTHER REFERENCES

Book, "Photoelectricity," by Zworykin and Ramberg, 1949, page 272.

EVON C. BLUNK, *Primary Examiner.*

JOHN M. HORAN, *Examiner.*

Disclaimer 3,199,402.—*Robert W. G. Hunt*, Wealdstone, and *Peter Bernard Watt*, Stonyhall, Stevenage, England. PRINTING APPARATUS FOR COLOR PHOTOGRAPHY. Patent dated Aug. 10, 1965. Disclaimer filed Sept. 19, 1973, by the assignee, *Eastman Kodak Company*.
Hereby enters this disclaimer to claim 1 of said patent.
[*Official Gazette May 13, 1975.*]